United States Patent
Gannon

[11] Patent Number: 6,149,850
[45] Date of Patent: Nov. 21, 2000

[54] ADDITION OF ADDITIVES TO POLYMERIC MATERIALS

[75] Inventor: Oliver Keith Gannon, Asheville, N.C.

[73] Assignee: BASF Corporation, Mt. Olive, N.J.

[21] Appl. No.: 08/166,168

[22] Filed: Dec. 10, 1993

Related U.S. Application Data

[63] Continuation of application No. 07/931,745, Aug. 18, 1992, abandoned, which is a continuation of application No. 07/586,365, Sep. 21, 1990, abandoned.

[51] Int. Cl.$^7$ .............................. D01F 1/02; B29C 47/60; C08K 3/20; C08L 77/00
[52] U.S. Cl. ............................... 264/211; 8/903; 8/904; 8/905; 8/906; 8/907; 264/211.22; 264/211.23; 523/343; 523/333; 523/351
[58] Field of Search ...................... 523/343, 351, 523/333; 8/903, 904, 905, 906, 907; 264/211, 211.23, 211.22

[56] References Cited

U.S. PATENT DOCUMENTS

| | | |
|---|---|---|
| 3,023,456 | 3/1962 | Palfey . |
| 3,040,005 | 6/1962 | Bernhardt et al. . |
| 3,376,603 | 4/1968 | Colombo . |
| 3,410,938 | 11/1968 | Schippers . |
| 3,563,514 | 2/1971 | Shattuck . |
| 3,742,093 | 6/1973 | Skidmore . |
| 3,846,507 | 11/1974 | Thomm et al. . |
| 4,002,593 | 1/1977 | Jones . |
| 4,065,532 | 12/1977 | Wild et al. . |
| 4,098,741 | 7/1978 | Login . |
| 4,294,749 | 10/1981 | Papenfuhs et al. . |
| 4,317,766 | 3/1982 | Kawasaki et al. . |
| 4,342,844 | 8/1982 | Torenbeek et al. . |
| 4,374,641 | 2/1983 | Burlone . |
| 4,405,734 | 9/1983 | Fuchs et al. . |
| 4,670,181 | 6/1987 | Mollinger et al. . |
| 4,750,910 | 6/1988 | Takayanagi et al. . |
| 4,755,585 | 7/1988 | Hanson et al. . |
| 4,877,823 | 10/1989 | Plachetta et al. . |

FOREIGN PATENT DOCUMENTS

| | | |
|---|---|---|
| 0056123 | 7/1982 | European Pat. Off. . |
| 0 125 483 | 11/1984 | European Pat. Off. . |
| 24 44 584 | 1/1979 | Germany . |

OTHER PUBLICATIONS

Bennett, D., "Requirements for Dispersions in Fiber Processing", *IFJ*, 1989, pp. 12, 14, 16, 19, 20, 22, 23 and 24. Additional Foreign Patent: GB 1202636 filed Nov. 7, 1968 (copy enclosed).

*Primary Examiner*—Patrick D. Niland

[57] ABSTRACT

A process for introducing additives into a polymer melt comprising dispersing at least one additive in an at least partially volatile liquid vehicle with a dispersant and a stabilizer for the dispersion; feeding the resulting dispersion to a vented extruder which is extruding a polymer; and removing the fed volatiles through the extruder vent to achieve a substantially homogeneous system containing the polymer and at least one additive is disclosed.

13 Claims, No Drawings

ADDITION OF ADDITIVES TO POLYMERIC MATERIALS

CROSS REFERENCE TO RELATED APPLICATIONS

This application is a continuation of U.S. patent application Ser. No. 07/931,745 filed Aug. 18, 1992, which is a continuation of U.S. patent application Ser. No. 07/586,365 filed Sep. 21, 1990, both now abandoned.

BACKGROUND OF THE INVENTION

This invention relates generally to the preparation of admixtures from thermoplastics. More specifically, the invention relates to the addition to a polymer melt of dispersed additives in a partially volatile liquid vehicle followed by removal of the vehicle.

It is known to modify the characteristics of thermoplastic materials by addition of additives. This addition normally occurs prior to the shaping step, that is, prior to spinning or other extrusion, injection molding, etc. For example, colorants, stabilizers (e.g., UV stabilizers for the thermoplastic), delusterants, flame retardants, fillers, antimicrobial agents, antistatic agents, optical brighteners, extenders, processing aids and other functional additives are used to impart preferred properties to the host polymer to which they are added. By way of illustration, the coloring of thermoplastic articles by incorporation of pigments introduced as color concentrates is well known. For the purposes of the present application, a concentrate contains the additive at a much higher loading than is desired in the final thermoplastic article. Typically, the coloring of fibrous materials through the use of color concentrates has presented unique challenges. The reasons for this are many fold. For instance, the amount of pigmentary particles dispersed in the concentrate must be high enough to impart satisfactory color density and yet must not be so high as to interrupt the spinning process.

When adding materials to nylon 6, moisture levels in the additive have formerly been kept as low as practical. The presence of excessive levels of water causes depolymerization and reduces the molecular weight and melt viscosity of nylon 6 to the point where bubbles will form in the extrudate or where fiber can no longer be formed. As a consequence, it has been important to keep moisture levels of concentrates low.

Pigment concentrate production may be performed by preparing a dispersion of the pigment in an aqueous medium. To achieve satisfactory dispersion, a water dispersible/soluble polymer may be used. It is normal in concentrate production to flush the pigment from an aqueous dispersion to an organic phase in a separate step prior to extrusion.

Another method of preparing pigment concentrates involves the preparation of an aqueous color dispersion which is dried to remove the water. For instance, U.S. Pat. No. 4,374,641 to Burlone describes the preparation of a color concentrate in an aqueous vehicle using a dispersant which is compatible with the thermoplastic material with which the concentrate will be blended. The aqueous color concentrate is filtered and dried to remove residual water. Both of these methods require an extra step, like flushing or drying.

In the processing of plastics, it has been described that additives may be introduced into the plastic extruder, generally in a finely divided form, such as granules or powders, with devolatilization of the volatiles present within the polymer stream. the method of U. S. Pat. No. 4,065,532 to Wild et al., the addition of major amounts of compatible liquid additives is described as being preferably done after devolitalization of the polymer.

There remains a need for a process by which additives present in liquid vehicles, which vehicles are not desirable in the final shaped polymer article, may be added to a polymer melt stream without interfering with the polymer's suitability for processing. Such a process is described hereinafter. As will be noted, this process, in some applications, employs dispersants to disperse the intended additive in the vehicle. These dispersants are often expensive. The invention disclosed herein results in decreased dispersant usage and also, in some cases, improved extrusion performance.

SUMMARY OF THE INVENTION

Accordingly, the present invention is a process for introducing additives into a polymer melt comprising dispersing at least one additive in an at least partially volatile liquid vehicle with a dispersant and a stabilizer for the dispersion; feeding the resulting dispersion to a vented extruder which is extruding a polymer; and removing the fed volatiles through the extruder vent to achieve a substantially homogeneous system containing the polymer and at least one additive.

It is an object of the present invention to provide an improved process for preparing modified thermoplastics.

Related objects and advantages will be apparent to one ordinarily skilled in the relevant art after reviewing the following description.

DESCRIPTION OF THE PREFERRED EMBODIMENTS

To promote an understanding of the principles of the present invention, descriptions of specific embodiments of the invention follow and specific language describes the same. It will nevertheless be understood that no limitation of the scope of the invention is thereby intended, and that such alterations and further modifications, and such further applications of the principles of the invention as discussed are contemplated as would normally occur to one ordinarily skilled in the art to which the invention pertains.

The present invention concerns a process for introducing soluble or insoluble additives into a polymer melt in an extruder where the additive as a dispersion in a vehicle having volatile constituents and shaping the admixed polymer without interference from the volatile vehicle constituents. Shaping may be by spinning into fibers, extrusion into tubes, injection molding or nearly any method known to form a polymer melt into a useful final article. In general, this process is the subject of copending U.S. patent application Ser. No. 07/586,636. The present invention is directed to the dispersion and methods for improving the performance of processes wherein it is used. As an illustration, the process described is useful in coloring any melt spinnable polyamide such as nylon 6, nylon 6,6, nylon 10, nylon 11, nylon 12 and co-polymers of these. Other thermoplastic polymers, such as polyesters, may improve also from use of the process. It is further contemplated that the process may be useful for introducing to polymeric melt processes other additives which are present in at least partially volatile vehicles. Examples of other additives which may be introduced are colorants, light and heat protectors for the thermoplastics, delusterants, flame retardants, fillers, antimicrobial agents, antistatic agents, optical brighteners, extenders, processing aids and other functional additives. It should be recognized that nearly any additive present in a partially undesirable volatile vehicle could be potentially successfully added to the polymer melt by the present process. Furthermore, it is not necessary that the polymer product resulting from the process is an admixture. However, for purpose of illustration only, the following discussion concerns the preparation of pigmented thermoplastic materials. The principles described below are readily adaptable to suit a particular application as will be apparent to one ordinarily skilled in the art The additive regardless of solubility is dispersed in a vehicle which is at least partially volatile under the conditions. For the present purposes, dispersed and dispersion refer to the presence of dispersants in the vehicle and do not indicate the solubility of the additive. When the additive is a pigment and the vehicle is aqueous, this dispersion may be prepared using the water soluble/dispersible polymers of U.S. Pat. No. 3,846,507 as a dispersant. This patent is hereby incorporated by reference for the water soluble/dispersible polymers taught therein. One particularly useful dispersant in this class is a copolymer of caprolactam/hexamethylenediamine/isophthalic acid/the sodium salt of sulfoisophthalic acid (hereinafter referred to as C-68 and manufactured by BASF Corporation.) Other related water soluble/dispersible polymers are useful in the present invention. These include, but are not limited to, other water soluble/dispersible polyamides and copolymers thereof, water soluble/dispersible polyesters and copolymers thereof, water soluble/dispersible vinyl polymers and co-polymers thereof, water soluble/dispersible alkylene oxide polymers and co-polymers thereof and water soluble/dispersible polyolefins and co-polymers thereof, as well as mixtures of these. But, of course, other dispersants, like monomeric dispersants, may be suitable for use with the present invention.

The dispersant is preferably present in the dispersion at a concentration of between about 0.075% and about 7.5% by total dispersion weight. As is apparent, the level of dispersant needed to most efficiently achieve the desired results will depend upon the particular pigment (or other additive) which is used and the target color density (or function). The upper limit of dispersant is related to the maximum total dispersant and pigment to polymer ratio which can be successfully extruded.

The addition of a stabilizer for the dispersion has been surprisingly discovered to disproportionately reduce the amount of the polymeric dispersant necessary for a suitable dispersion to be prepared. The stabilizer for the dispersion is preferably present at between abut 0.75% and 7.5% by total dispersion weight. Furthermore, in some instances, the use of the stabilizer for the dispersion causes additional decreases in the polymer melt Pressure Index. The production of some black pigment concentrates is exemplary of a process improved by addition of the stabilizer for the dispersion. Stabilizers for the dispersion suitable for this purpose include many standard nonionic species and likely include many anionic species. Among these are polyethoxylates, polypropoxylates, block copolymeric polyethers, long chain alcohols, polyalcohols, alkyl-sulfates, alkyl-sulfonates, alkyl-benzenesulfonates, alkyl-phosphates, alkyl-phosphonates, alkyl-napthalene sulfonates, carboxylic acids and perfluoronates.

One stabilizer for the dispersion that is presently preferred is a polyethoxylated alkyl phenol (Triton X-100 (TX100)). TX100 yields Pressure Indices (as determined by the method described below) less than about 5 in the about 6 to about 50 wt % range based on the weight of pigment in conjunction with C-68 concentrations as low as about 0.5% (based on pigmentary weight). In this aspect, about 20% TX100 with about 0.1 to 10% C-68 is presently preferred. Specifically, 20% TX100 with 0.5% C-68 yields a Pressure Index of about 0.7. This is in contrast to a Pressure Index of about 0.9 when about 100% C-68 (based on pigment weight) is used alone.

The dispersion may be prepared according to standard methods by, for example, mixing a pigment press cake with dispersant and stabilizer for the dispersion containing water until all of the components of the dispersion are appropriately dissolved and/or dispersed. The pigment concentration of the dispersion is preferably between about 15% and about 50% by total dispersion weight. As with dispersant concentration, the most preferable pigment concentration will depend on color density and processibility of the extrudate. The dispersion may be subjected to mechanical energy to be certain that the dispersion particles are of sufficiently small and uniform size. This may be accomplished, for example, by milling through a Chicago Boiler Company Model KDL Pilot Dyno Mill or other suitable mill. The reduction in dispersion particle size may be monitored by measuring the Pressure Index.

The Pressure Index (psi pressure increase/gram pigment) is obtained by mixing the desired concentrate with the polymer to be modified to give (in the case of pigment addition) a pigment concentration of 5%. The 5% concentrate and polymer blend is extruded at 275° C. through a 35 mm 165×1400 mesh filter screen (nominal 10 micron). The extrudate rate is adjusted so that the pressure drop across the filter screen is about 2000 psi. The test is run for two hours or until the pressure reaches about 3000 psi, whichever comes first. The pressure rise above 2000 psi and the calculated grams of pigment through the filter are used to calculate the Pressure Index.

The dispersion (or additive present in the volatile vehicle) may be added to a polymer stream to make a concentrate, which is then cooled and cut into chips or added in the molten phase directly to a primary melt stream. The dispersion may also be added directly to the primary melt stream being extruded through a twin screw vented extruder without first preparing a concentrate. When the goal is concentrate preparation, the dispersion is preferably thoroughly mixed with a compatible polymer, preferably of the same type in which the concentrate will finally be used. When the goal is direct production of a shaped article from a dispersion and a polymer melt stream, the dispersion and the polymer are preferably mixed in the extruder. In either case the intimate mixing occurs preferably by adding the dispersion to a twin screw vented extruder such as those available from Werner & Pfleiderer or American Leistritz. To be sure of intimate mixing, the screw speed and zone temperatures should be monitored and set as appropriate for the particular pigment and thermoplastic material being extruded. The extrusion rate should be monitored, also.

The dispersion is preferably metered into the appropriate zone of the extruder to give a specific predetermined extruder output. Metering may be accomplished by a meshed gear pump, a piston pump, a diaphragm pump or other suitable metering means.

At the appropriate zone, the vehicle is preferably removed by using a LEMA 50 Type 20605 water sealed vacuum pump. The final extrudate, in the case of a pigment concentrate, preferably has a concentration of about 25% of pigment, about 0.25% to 2.5% dispersant, about 5% stabilizer for the dispersion, and about 65% to 70% thermoplastic polymer by weight based on total weight of the concentrate.

When a concentrate is prepared, the concentrate may then be cooled, cut into chips and dried as desired. The fresh concentrate composition or concentrate chip may be used directly in the production of a thermoplastic polymer having a desired color density. Where the concentrate is used in fiber spinning, the concentrate is preferably added to the polymer so that the final pigment concentration in the fiber is about 1%. Spinning performance of the extruded thermoplastic material may be measured by spin pack pressure rise or estimated by the Pressure Index. In general acceptable spinning performance results in a Pressure Index of about 10 or less, more preferably about 5 or less. It has been discovered that the Pressure Index achieved with the present invention is easily maintained below 10 and is surprisingly much better than the Pressure Index obtained with presently available commercial pigment concentrates and may surprisingly, in some cases, be better than when the dispersant is used alone.

The invention will now be described by referring to the following detailed examples. These examples are set forth by way of illustration and are not intended to be limiting in scope.

EXAMPLE 1

Pigment Dispersion Through Use of a Stabilizer

A dispersion containing, per weight of the dispersion, 15% Raven Black 1200, 0.75% of the water dispersible polyamide of U.S. Pat. No. 4,098,741 (C-68) (5% based on pigment weight), 3% Triton X-100 (20% based on pigment weight), and 81.3% H$_2$O is prepared in the following manner:

45 gms of C-68 and 180 gMs of TX100 is added sequentially to 4875 gms of H$_2$O that is being stirred at 1500 rpms with a Cowles Mixer. 900 gms of Raven Black 1200 is added in increments to give a final sample weight of 6 kg and the mixture is stirred for 1 hr. The dispersion is passed three times through a laboratory scale beadmill such as that available from Chicago Boiler Company as Model KDL Pilot Dyno Mill. The concentrate is prepared on a Werner & Pfleiderer co-rotating Twin screw vented extruder. The screw speed is 75–100 rpms and the zone temperatures are set at 275° C. The nylon 6 is metered into the throat of the extruder at 15 gms/min The dispersion is metered into zone 2 of the extruder at 33.6 gms/min. The water is removed at zone 4 using a water aspirator vacuum source. The concentrate composition is 25% pigment, 1.15% C-68, 5% TX100, and 68.75% Nylon 6, calculated.

Nine hundred (900) gms of the concentrate chips are dried for 24 hours in a vacuum oven and then mixed with 3600 gms of dry nylon 6 chip. The mixture is then fed through a 10 μm spin-pack at approximately 25 gms/min. The pressure required to maintain a constant polymer feed through the spin pack is recorded on a chart recorder and converted to a Pressure Index.

The Pressure Index recorded for this sample is 0.0 after approximately 3 hrs of testing. A control sample that contained 100% C-68 (based on pigment weight) and 0% TX100 has a Pressure Index of 0.9 after 3 hrs. Table 1 provides a listing of pressure indices for samples of various C-68/TX100 compositions.

TABLE 1

| Wt %* TX100 | Wt %* C-68 | Pressure Index |
| --- | --- | --- |
| 0.0 | 100 | 0.9 |
| 0.0 | 83 | 1.0 |
| 20.0 | 0.5 | 0.7 |
| 20.0 | 1.0 | 0.1 |
| 20.0 | 5.0 | 0.0 |
| 20.0 | 10.0 | 0.0 |
| 20.0 | 15.0 | 0.8 |

*all concentrations are based on pigment weight.

What is claimed is:

1. A process for introducing additives into a thermoplastic polyamide melt comprising:

a) dispersing at least one pigment or nonpigment colorant or mixture thereof in an at least partially aqueous volatile liquid vehicle with a water dispersible/soluble polymeric dispersant and a stabilizer for the resulting aqueous dispersion wherein the dispersion contains between about 0.075% and about 7.5% dispersant by total dispersion weight and between about 0.75% and about 7.5% of stabilizer by total dispersion weight;

b) feeding the resulting aqueous dispersion to a vented extruder which is extruding a polymer;

c) removing the fed volatiles through the extruder vent to achieve a substantially homogenous system containing the polyamide and at least one pigment or nonpigment colorant or mixture thereof; and d) extruding the substantially homogenous system through a spin pack to form fiber, wherein the Pressure Index in the spin pack does not exceed about 10.

2. The process of claim 1 wherein the extruder is a twin screw vented extruder.

3. The process of claim 1 wherein the dispersant is selected from:

water dispersible/soluble polyamides or copolymers;
    water dispersible/soluble polyesters or copolymers;
    water dispersible/soluble vinyl polymers or copolymers;
    water dispersible/soluble alkylene oxide polymers or copolymers;
    water dispersible/soluble polyolefines or copolymers; and
    mixtures thereof.

4. The process of claim 3 wherein the dispersant is a water dispersible/soluble copolymer of caprolactam/hexamethylenediamine/isophthalic acid/sulphonated isophthalic acid or a salt thereof.

5. The process of claim 4 wherein the stabilizer is one or more of:

polyethoxylates;
    polypropoxylates;
    block copolymeric polyethers;
    long chain alcohols;
    polyalcohols;
    alkyl-sulfates;
    alkyl-sulfonates;
    alkyl-benzenesulfonates;
    alkyl-phosphates;
    alkyl-phosphonates;
    alkyl-naphthalenesulfonates;
    carboxylic acids; and
    perfuoronates.

6. The process of claim 1 wherein the polymer melt is nylon 6.

7. The process of claim 1 wherein said feeding is through at least one injection port and is of more than one dispersion.

8. The process of claim 7 wherein the additives are fed through the same injection port.

9. A process for preparing colored thermoplastics polyamides comprising:
   a) preparing in an at least partially aqueous volatile vehicle a dispersion of a pigment or nonpigment colorant or mixture thereof, a water dispersible/soluble polymeric dispersant and a stabilizer of said dispersion wherein the dispersion contains between about 0.075% and about 7.5% dispersant by total dispersion weight and between about 0.75% and about 7.5% of stabilizer by total dispersion weight;
   b) adding the prepared aqueous dispersion to a twin screw vented extruder which is extruding a molten thermoplastic polyamide;
   c) removing volatiles present in the thermoplastic polyamide from the addition of the dispersion; and
   d) extruding the thermoplastic polyamide through a spin pack to form fiber, wherein the Pressure Index in the spin pack does not exceed about 10.

10. The process of claim 9 wherein the dispersant is selected from:
   water dispersible/soluble polyamides or copolymers;
   water dispersible/soluble polyesters or copolymers;
   water dispersible/soluble vinyl polymers or copolymers;
   water dispersible/soluble alkylene oxide polymers or copolymers;
   water dispersible/soluble polyolefines or copolymers; and mixtures thereof.

11. The process of claim 9 wherein the stabilizer is selected from:
   polyethoxylates;
   polypropoxylates;
   block copolymeric polyethers;
   long chain alcohols;
   polyalcohols;
   alkyl-sulfates;
   alkyl-sulfonates;
   alkyl-benzenesulfonates;
   alkyl-phosphates;
   alkyl-phosphonates;
   alkyl-naphthalenesulfonates;
   carboxylic acids; and
   perfluoronates.

12. The process of claim 1 wherein the substantially homogenous system is a batch concentrate containing 60–70% by weight of a polyamide or; about 25% by weight of a pigment or a nonpigment colorant; 0.25–2.5% by weight of the dispersant and about 5% by weight of the stabilizer for the dispersion.

13. The process of claim 9 wherein the substantially homogenous system is a batch concentrate containing 60–70% by weight of a polyamide or about 25% by weight of a pigment or a nonpigment colorant; 0.25–2.5% by weight of the dispersant and about 5% by weight of the stabilizer for the dispersion.

* * * * *